Aug. 9, 1949.                R. J. KOCHENBURGER                2,478,279
                                CONTROL SYSTEM
                              Filed July 7, 1945
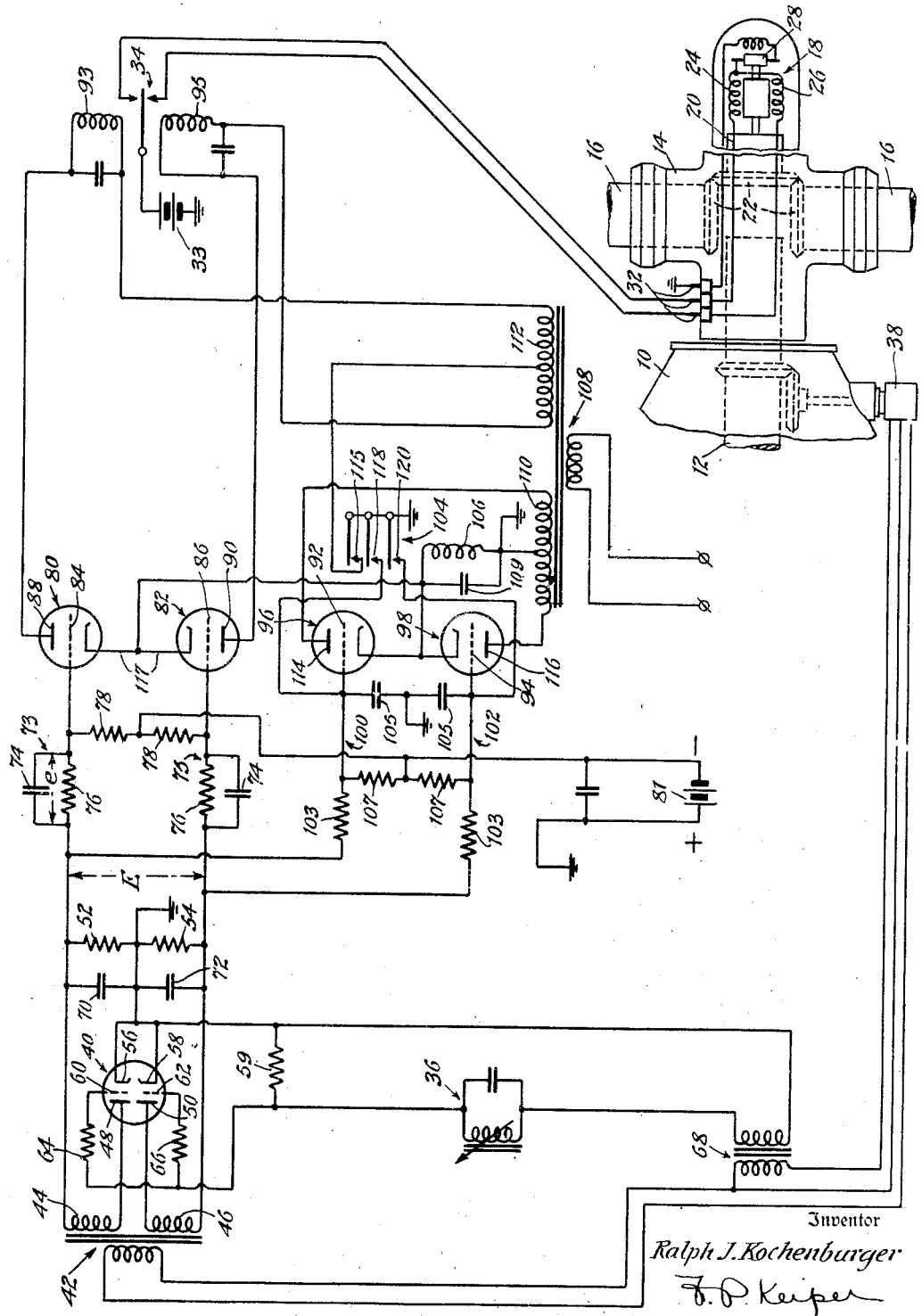
Inventor
Ralph J. Kochenburger
F. P. Keiper
Attorney Patented Aug. 9, 1949

2,478,279

UNITED STATES PATENT OFFICE 2,478,279

CONTROL SYSTEM

Ralph J. Kochenburger, Clifton, N. J., assignor to Curtiss-Wright Corporation, a corporation of Delaware Application July 7, 1945, Serial No. 603,607

2 Claims. (Cl. 175—320)

This invention relates to a control system for prime movers and more particularly to a system for maintaining or establishing a selected prime mover speed.

In control systems of the class set forth wherein a high degree of sensitivity is present and in which the response of the prime mover lags behind the actuation of the controlling mechanism, provision is made for discontinuing the actuation of the controlling mechanism prior to the attainment of the desired speed by the prime mover, in order to prevent "hunting." The actuation may be discontinued when the controlling mechanism is so positioned as to correspond to the position required for the speed desired. In instances where the rate of speed change is rapid, the actuation may be reversed after the controlling mechanism has passed beyond the corresponding position required, and discontinued when the position corresponding to the speed desired is reached. Greatest dispatch in arriving at the desired speed, or equilibrium, may be had when such reverse actuation of the control terminates at the control position for the desired speed substantially at the same instant that the prime mover arrives at the same speed.

Control systems having the sensitivity required to produce the above results are often so sensitive as to be set in motion in response to momentary changes in speed of the prime mover, such momentary changes actually requiring no corrective action on the part of the control. Such momentary disturbances may be the result of torsional vibrations inherent in the prime mover or the result of other stray conditions. Where the vibrations are of high frequency, and electrical acceleration sensitive circuits are employed which transmit such high frequencies with less attenuation than the attenuation of the basic control signal, the stray high frequency currents imposed on the circuits may be amplified to a level above that of the normal control voltages and initiate false actuation of the control. The invention has to do with the introduction of means for preventing such stray conditions from initiating operation, and the provision of means for initiating operation when a bona fide off-speed condition exists, for which correction is desired.

It is, accordingly, an object of the present invention to provide in such a control system, means sensitive to irregularities in speed capable of delaying the action or initiation of operation of the control mechanism, except when the off-speed condition is substantial and over a substantial period of time.

Another object of the invention is to provide in a highly sensitive speed control system, a time delay means adapted to prevent operation of the control except upon the existence of an off-speed condition having characteristics indicating that a correction of the control is desirable.

Another object of the invention is to provide in a highly sensitive speed control system employing an acceleration-stabilized responsive circuit, an integrating circuit responsive to fluctuations in speed and capable of preventing minor speed changes of short duration from initiating operation of the acceleration-stabilized circuit, without subsequently interfering with operation of the acceleration-stabilized circuit.

Yet another object of the invention is the provision of an integrating circuit in combination with an acceleration responsive circuit in a control of the type set forth so arranged that the integrating circuit restricts the operation of the acceleration responsive circuit to conditions requiring control actuation to attain a desired speed.

The above and other novel features of the invention will appear more fully hereinafter from the following detailed description when taken in conjunction with the accompanying drawing. It is expressly understood, however, that the drawing and description thereof are employed for purposes of illustration only and are not designed as a definition of the limits of the invention, reference being had for this purpose to the appended claims.

The single figure illustrates a control circuit and accompanying apparatus in the application of the invention to a speed control for an engine propeller combination.

Referring to the drawing, there is shown diagrammatically a prime mover 10, which may be an internal combustion engine directly connected through a shaft 12 to the hub 14 of a variable pitch propeller. The blades 16 of the propeller are adapted to have their pitch changed by means of a reversible pitch-changing motor 18 drivably connected to the shanks of the propeller blades 16 through reduction gearing 20 and bevel gears 22. The motor is provided with reversely wound fields 24 and 26 and magnetic brake 28, the latter being connected in series with the armature 30 and either one of the fields 24 and 26 through slip ring connections 32. A double pole relay 34 is connected to the fields 24 and 26 so that by actuating the relay from its normally open position to connect one pole or the other to the battery 33, the one or the other field of the motor is energized to cause the motor to rotate in one direction or the other to increase or decrease the pitch of the propeller blades.

In order to regulate the speed of the prime mover, there is provided a manually variable-tuned resonant circuit 36 having a frequency range in the order of the frequency range of a two-phase alternator 38 directly driven by the engine shaft 12. The alternator and tuned circuit are connected in a discriminator circuit capable of producing a voltage indicative of the difference in frequency of the alternator and tuned circuit resonant frequency, which difference is a direct index of the speed difference between the engine and the desired speed as represented by the particular frequency adjustment of the tuned resonant circuit. More particularly, the discriminator circuit employs the two phases having a 90-degree phase relationship to one another of the alternator 38, to create a balanced flow of current in the two branches of a twin triode 40. For this purpose, one of the phases of the alternator is connected through a transformer 42 having secondaries 44 and 46 connected in opposition to the plates 48 and 50 of the twin triode 40. The other ends of the secondaries are connected through load resistances 52 and 54 to a common connection leading to the cathodes 56 and 58 of the twin triode 40. The grids 60 and 62 are connected together through grid limiting resistors 64 and 66 and are then connected to the cathodes 56 and 58 of the twin triode 40 through the shunt resistor 59 and also through the series combination of tuned-resonant circuit 36 and the secondary of transformer 68. The primary of transformer 68 is excited by the other phase output voltage of alternator 38. Thus, except for the effect of the tuned circuit 36, the grids 60 and 62 are normally excited 90 degrees out of phase with each of the plates 48 and 50 which latter are excited 180 degrees out of phase with respect to one another.

The tuned circuit, depending upon whether its resonant frequency as manually selected for a desired corresponding speed is above or below that of the alternator frequency, advances or retards the phase relationship of the grid excitation. The advancing or retarding of the phase causes one of the grids to become more in phase with one of the plates 48 and 50 and more out of phase with the other, thereby increasing the flow of current through one-half of the twin triode while reducing the flow through the other half. With both grids equally out of phase with their respective plates, the current flows through the load resistances 52 and 54 are equal and opposite and completely neutralize one another resulting in a zero voltage at E. The shifting of the phase of the grid voltage more into phase with one plate and more out of phase with the other creates a greater current flow in the corresponding load resistance 52 or 54 resulting in the creation of a voltage E proportional to the shift in phase of the grid voltage, and of a polarity depending upon the direction of the phase shift. Capacities 70 and 72 act to smooth out the pulsating current delivered from the twin triode 40 acting as two half-wave rectifiers and transforms the voltage E into a reasonably smooth direct current signal voltage.

It will be seen that such a circuit is substantially instantaneous in its response to a variation in speed of the alternator 38 and its generated frequency from the corresponding selected frequency of the tuned circuit 36. The voltage E is therefore an algebraic indication of the difference between actual speed of the prime mover and the desired speed.

The signal voltage E is adapted to actuate the relay 34 in accordance with the sense of the voltage in order to connect the relay contactor with one or the other of its poles so as to set the pitch-changing motor in operation in a direction to cause the prime mover to change its speed in the direction of the speed desired. As the prime mover commences to change its speed, the voltage E is gradually reduced and the pitch-changing motor may be caused to continue to change the pitch of the propeller blades until such voltage is reduced to zero and the relay opens. Thus, there is provided a highly sensitive and instantaneously acting control, which could be expected to function perfectly except for the lag of the prime mover in responding to the changes in propeller pitch. Because of the lag in response, when the engine propeller combination reaches the desired speed, the equilibrium speed for that pitch setting exceeds the desired speed. The prime mover, while having reached the desired speed, will not have increased its speed to that which would correspond to the pitch setting attained by the propeller blades by the time the signal voltage is reduced to zero. The net result is that the prime mover continues to change its speed so as to approach the equilibrium speed for the particular propeller pitch attained. The prime mover speed would, therefore, change beyond the desired amount and would set up a voltage E in the reverse direction and cause the relay 34 to close the other pole, setting the pitch-changing motor in reverse operation to oppositely change the speed of the prime mover.

To avoid the hunting resulting from the sensitivity of such an arrangement, acceleration-responsive circuits 73 and 75, each composed of a capacity 74, a resistor 76 in parallel therewith and a resistor 78 connecting the capacity and resistor through a grid biasing battery 81 to ground are provided in connection with each of the relay control triodes 80 and 82. The acceleration-sensitive circuits are connected to the grids 84 and 86 of the tubes 80 and 82 in order to control the flow of current through the tubes between their respective plates 88 and 90 and cathodes 117 and through their respective energizing coils 93 and 95 of the relay 34. The acceleration-sensitive circuit is so arranged that a voltage $e$ is developed across each of the capacities 74 proportional not only to the magnitude of E but also to the rate of change of the voltage E. The voltage appearing between the two grids 84 and 86 will therefore be proportional to E when E is not varying with time but will increase further in magnitude when E is increasing with respect to time and decrease in magnitude when E is decreasing with respect to time. In other words, since E is an indication of the speed deviation, the voltage appearing between grids 84 and 86 will be a combined indication of the speed deviation and acceleration. With such a circuit, the voltage $e$ opposes the signal voltage E so that the voltage appearing on the grids 84 and 86 of the triodes 80 and 82 may be reduced to zero prior to the reduction of the signal voltage E to zero which latter occurs only when the frequency of the generator 38 and the resonant circuit 36 are synchronized. The effect of neutralizing the signal voltage E prior to the engine reaching the desired speed may be used to discontinue the operation of the pitch-changing motor 18 at the pitch required for the equilibrium speed of the prime mover desired with the result that the prime mover may thereafter change its speed to such equilibrium speed. The time interval thus required varies with the rate at which the engine is changing speed as well as the lag or difference between the desired speed and the actual speed at any particular instant. The capacity and resistors of the acceleration responsive circuit may be so chosen as to accurately anticipate the precise time for discontinuing the operation of the pitch-changing motor 18. In fact, the circuit is such that with high rate of acceleration of the motor, a voltage e may be developed greater than the signal voltage E with the result that the pitch-changing motor may be momentarily reversed in its operation, to bring the propeller pitch back to the correct pitch adjustment at approximately the instant the prime mover reaches the corresponding desired equilibrium speed.

In installations employing prime movers having torsional vibrations and other momentary disturbances which would cause the alternator 38 to set up extraneous frequencies in the transformers 42 and 68 well above that of the range of the tuned circuit 36, the circuit so far described results in the amplification of such signals and the creating of a false voltage on one of the grids 84 and 86 having no bearing or relationship to the speed difference signal voltage E previously described.

The reactance of the capacity 74 of the acceleration responsive circuits 73 and 75 when stray high frequency voltages are imposed thereon is greatly reduced. Such strays could uselessly initiate operation of the relay 34 and the actuation of the pitch-changing motor.

To prevent the acceleration-controlled circuit from operating except in response to a bona fide off-speed condition which requires a change of the propeller pitch for correction, an integrating circuit is employed to control operation of the acceleration circuit in such manner as to be sensitive to the appearance of a signal voltage and its duration, the integrating circuit acting in response to the presence of such a voltage for a period greater than the transient periods of false signal voltages created by the stray frequencies. The integrating circuit acts as a time delay circuit and is so arranged as to prevent the operation of the acceleration-controlled circuit previously described except after the establishment of a signal voltage E of such magnitude and duration as to be a clear indication of a condition requiring a change of pitch to maintain the desired speed.

For this purpose, the signal voltage E is impressed across the grids 92 and 94 of a pair of triodes 96 and 98 through a pair of integrating or time-delay circuits 100 and 102, each composed of a series resistor 103 and a capacity 105 and resistor 107 connected in parallel to ground, through the grid biasing battery 81, acting as a common grid bias for the previously referred to triodes 80 and 82 as well as the triodes 96 and 98. The triodes 96 and 98 are preferably normally biased close to cut-off so that their zero signal cathode current will not energize the relay 104. Upon the establishment of a signal voltage E over a sufficient period to render one of the grids 92 or 94 less negative so as to substantially increase the flow of plate current through one or the other of the triodes 96 and 98, the relay 104 is caused to operate by reason of the increased flow of plate currents in either triode 96 or 98 through the relay coil 106. Plate current for the relay 34 and relay 106 is provided from a transformer 108 having divided center tap secondaries 110 and 112, the secondary 110 being connected to the plates 114 and 116 of the triodes 96 and 98 and relay coil 106 and the secondary 112 being connected to the plates 88 and 90 of the triodes 80 and 82 through the respective relay coils 93 and 95. The center tap of the secondary 112 is connected through the contact 115 of the relay 104 to ground and the cathodes 117 of the triodes 80 and 82 are connected through relay coil 106 to ground, so that until the time delay relay 104 is energized by a flow of plate current in triode 96 or 98 through the relay coil 106, the triodes 80 and 82 and the relay coils 93 and 95 are deenergized. Thus, until a signal voltage E of a sufficient duration and magnitude is present, the initiation of the operation of the relay 34 and the acceleration-controlled circuits 73 and 75 is prevented. The relay 104 is provided with additional contacts 118 and 120 connected across the capacities 105 so as to discharge the capacities once the relay is operated and thereby prepare the integrating circuits for such future operation as may occur. It will be observed that the plate circuits of the tubes 80 and 82 are completed through closure of switch 115 to ground, and from ground through the coil 106 of the relay 104 to the cathodes 117 of the tubes 80 and 82 so that when tubes 80 and 82 conduct, relay 104 is held closed until such time as the combined current flowing through the relay coils 93 and 95 is reduced by the return of both grids 84 and 86 of the triodes 80 and 82 to the normal negative bias existing when the sum of the signal voltage E and the voltage e finally reaches zero. The capacity 109, across coil 106 and the inductance of coil 106, however, prevent the release of the relay upon an instantaneous reversal of the sum of the voltages E and e, as zero voltage is crossed, the operation being such as to delay the opening of the relay a slight interval until after the voltages E and e, disappear due to the establishment of an "on speed" condition of the prime mover and the discharge of the capacities 74 of the acceleration responsive circuits 73 and 75.

The operation of the system has been set forth in connection with the description thereof for clarity. Briefly however, a cycle of operation follows the establishment of a voltage E over a sufficient time indicating a bona fide off-speed condition requiring a change in pitch control, the time required to determine such off-speed condition being established by the constants of the integrating circuits 100 and 102. When an off-speed condition is determined to exist, relay 104 operates to complete the plate relay coil circuits of relay 34 and triodes 80 and 82, so that the grid voltages derived from the signal voltage E and the voltage e indicating rate of change of voltage E, may then effect accurate control in the operation of the relay 34. Once such operation is concluded, relay 104 is opened and the cycle is ready for the next off-speed condition.

There has been provided a novel speed control circuit for a prime mover control system having the advantages of accurate acceleration control, and the sensitivity required therefor, but in which the operation of such circuit is made to depend upon the entrance of a bona fide off-speed condition, sufficiently substantial to require correction. The off-speed may be slight, but if of a sufficient duration, such slight off-speed will be permitted to effect a change in the control to correct the speed. The off-speed may be great in which case, correction being more urgent, a shorter duration of the condition will suffice to set the control in operation. But if the off-speed be of a rapidly repetitive nature, operation of the control will be effectively blocked.

Though a single circuit and system embodying the invention has been illustrated and described, it is to be understood that the invention is not limited thereto but may be embodied in various modifications and arrangements which may be made without departing from the spirit of the invention as will be apparent to those skilled in the art. Accordingly, reference will be had to the appended claims for a definition of the limits of the invention.

What is claimed is:

1. In a control system, means to produce a continuous variable D. C. signal voltage, a voltage modifying circuit means connected to said voltage producing means for differentiating said signal voltage against time to produce a voltage component proportional to the rate of change of said voltage and for adding said component to said signal voltage to produce a modified signal voltage, a first control relay, a relay control circuit connected to the output end of said voltage modifying circuit means and to said relay and having a switch therein, a circuit having integrating and time delay characteristics connected to and fed by said signal voltage producing means and receiving its input prior to modification of said signal voltage by said modifying circuit, a second relay having an input element connected to the output of said integrating circuit and energized thereby, said second relay having means for operating said switch, said second relay input element comprising control means to energize said relay in response to the integrated signal voltage from said integrating circuit only after the integrated signal voltage has attained a predetermined level, said output switch operating means when energized by said second relay serving to close said switch to connect the voltage modifying circuit means to said first relay.

2. In a control system, means to produce a continuous variable D. C. signal voltage, a voltage modifying circuit means connected to said voltage producing means for differentiating said signal voltage against time to produce a voltage component proportional to the rate of change of said voltage and for adding said component to said signal voltage to produce a modified signal voltage, a first control relay, a relay control circuit connected to the output end of said voltage modifying circuit means and to said relay and having a switch therein, a circuit having integrating and time delay characteristics connected to and fed by said signal voltage producing means and receiving its input prior to modification of said signal voltage by said modifying circuit, a second relay having an input element connected to the output of said integrating circuit and energized thereby, said second relay having means for operating said switch, said second relay input element comprising control means to energize said relay in response to the integrated signal voltage from said integrating circuit only after the integrated signal voltage has attained a predetermined level, said output switch operating means when energized by said second relay serving to close said switch to connect the voltage modifying circuit means to said first relay and means responsive to energization of said second relay for discharging the charge stored in said integrating and time delay circuit during the time delay period.

RALPH J. KOCHENBURGER.

REFERENCES CITED

The following references are of record in the file of this patent:

UNITED STATES PATENTS

| Number | Name | Date |
|---|---|---|
| 2,088,659 | Moseley | Aug. 3, 1937 |
| 2,115,086 | Riggs | Apr. 26, 1938 |
| 2,225,346 | LaPierre | Dec. 17, 1940 |
| 2,256,463 | Alexanderson | Sept. 23, 1941 |
| 2,347,714 | Sorenson | May 2, 1944 |
| 2,351,079 | Strobel | June 13, 1944 |
| 2,382,847 | Baumann | Aug. 14, 1945 |
| 2,390,084 | Edwards | Dec. 4, 1945 |
| 2,399,685 | McCoy | May 7, 1946 |
| 2,408,451 | Sorenson | Oct. 1, 1946 |
| 2,413,028 | McCoy | Dec. 24, 1946 |